(12) United States Patent
Morales Anton et al.

(10) Patent No.: US 11,319,071 B2
(45) Date of Patent: May 3, 2022

(54) PASSENGER ENTERTAINMENT DEVICE, PASSENGER SEAT ARRANGEMENT AND VEHICLE

(71) Applicant: Airbus Operations GmbH, Hamburg (DE)

(72) Inventors: Alejandro Morales Anton, Hamburg (DE); Taco Stouten, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 58 days.

(21) Appl. No.: 16/843,033

(22) Filed: Apr. 8, 2020

(65) Prior Publication Data
US 2020/0324903 A1 Oct. 15, 2020

(30) Foreign Application Priority Data

Apr. 11, 2019 (EP) ..................................... 19168744

(51) Int. Cl.
*B64D 11/00* (2006.01)
*B64D 11/06* (2006.01)

(52) U.S. Cl.
CPC .. *B64D 11/00152* (2014.12); *B64D 11/00155* (2014.12); *B64D 11/0638* (2014.12); *B64D 11/0624* (2014.12); *B64D 11/0627* (2014.12)

(58) Field of Classification Search
CPC ........ B64D 11/00152; B64D 11/00155; B64D 11/0638

(Continued)

(56) References Cited

U.S. PATENT DOCUMENTS

2004/0239155 A1\* 12/2004 Fourrey ................. B60N 3/004
297/163 X
2005/0206206 A1\* 9/2005 Peng ................ B64D 11/00151
297/217.3 X (Continued)

FOREIGN PATENT DOCUMENTS

EP 2962937 A1 1/2016
FR 3070333 A1 3/2019

OTHER PUBLICATIONS

W. Ma, "Thermally Stable, Efficient Polymer Solar Cells in Nanoscale Control of the Interpenetrating Network Morphology" Wiley-VCH Verlag GmbH & Co. KGaA, Weinheim, 2005, pp. 1617-1622.

(Continued)

*Primary Examiner* — Anthony D Barfield
(74) *Attorney, Agent, or Firm* — Greer, Burns & Crain, Ltd.

(57) ABSTRACT

A passenger entertainment device operated by a controller associated with a vehicle passenger seat. The passenger seat includes a seat, a backrest and a pocket in a back surface of the backrest facing away from the seat. The entertainment device includes a base, a display attached to a base front surface and a cover pivotably attached to the base pivotable between a first position, in which the cover covers the display, and a second position, in which the cover exposes the display. A first fastener of the entertainment device is configured to interact with a second fastener on the seat to define a fastening system for detachably fastening the cover to the seat backrest when the cover is arranged in its second position and inserted into the seat pocket, while the base is arranged outside of the pocket with the display facing away from the seat backrest.

20 Claims, 6 Drawing Sheets

(58) Field of Classification Search
USPC .................................................. 297/217.3
See application file for complete search history.

(56) References Cited

U.S. PATENT DOCUMENTS

| | | |
|---|---|---|
| 2006/0175882 A1 | 8/2006 | Schweizer |
| 2011/0174926 A1* | 7/2011 | Margis ............. B64D 11/00151 |
| | | 297/217.3 X |
| 2014/0043121 A1 | 2/2014 | Sartee et al. |
| 2015/0123433 A1 | 5/2015 | Lamb, Jr. et al. |
| 2016/0009394 A1 | 1/2016 | Felske et al. |

OTHER PUBLICATIONS

W. Helfrict et al., "Recombination Radiation in Anthracene Crystals" Feb. 15, 1965, vol. 14, No. 7, pp. 229-232.

C.W. Tang et al., "Organic Electroluminescent Diodes" Research Laboratories, Corporate Research Group, Eastman Kodak Company, Rochester, New York 14650, May 12, 1987, pp. 913-915.

J.H. Burroughes et al., "Light-Emitting Diodes Based on Conjugated Polymers" Cavendish Laboratory, University Chemistry Laboratory, UK, vol. 347, Oct. 11, 1990, pp. 539-541.

K. Kamtekar et al., "Recent Advances in White Organic Light-Emitting Materials and Devices (WOLEDS)" Advanced Materials, 2010, pp. 572-582.

S. Forrest et al., "Measuring the Efficiency of Organic Light-Emitting Devices" Advanced Materials, 2003, pp. 1043-1048.

B. D'Andrade et al., "White Organic Light-Emitting Devices for Solid-State Lighting" Advanced Materials, 2004, pp. 1585-1595.

Y. Chang et al., "White Organic Light-Emitting Diodes for Solid-State Lighting" Journal of Display Technology, vol. 9, No. 6, Jun. 6, 2013, pp. 459-468.

T. Hebner et al., "Ink-Jet Printing of Doped Polymers for Organic Light Emitting Devices" Applied physics Letters, vol. 72, No. 5, Feb. 2, 1998, pp. 519-521.

J. Bharathan et al., "Polymer Electroluminescent Devices Processed by Inkjet Printing: I. Polymer Light-Emitting Logo" Applied Physics Letters, vol. 72, No. 21, May 25, 1998, pp. 2660-2662.

M. Wagaman et al., "Synthese of PNV Homo- and Copolymers by a ROMP Precursor Route" Synthetic Metals, No. 84, 1997, pp. 327-328.

"DuPont Delivers New TV OLED Technology with Record Lifetime Performance" May 18, 2010, https:/phys.org/news/2010-05-dupont-tv-oled-technology-lifetime.html.

"Introduction to OLED Displays Design Guide for Active Matrix OLED (AMOLED) Displays" May 22, 2008, www.4dsystems.com.au, pp. 1-30.

C. Lin et al., "A Novel Top Emissing Pixel Circuit Compensating for TFT Threshold Voltage Variation and Luminance Degradation of OLED" IEEE, pp. 385-388.

K. Sarma et al., "Active Matrix OLED Using 150° C. a-Si TFT Backplane Built on Flexible Plastic Substrate" Cockpit Displays X, vol. 5080, 2003, pp. 180-191.

A. Fallahi et al., "Electronic Supplementary Information (ESI), Cationic Water-Soluble Conjugated Polyelectrolytes/Graphene Oxide Nanocomposites as Efficient Green Hole Injection Layers in OLEDs" pp. 1-4.

"PMOLED vs AMOLED—what's the difference?" www.oled.info.com/pmoled-vs-amoled-whats-difference, May 26, 2020.

W. Salaneck et al., "Conjugated Polymers and Related Materials" The Interconnection of Chemical and Electronic Structure.

"DuPont Print 50 Inch OLED Screen in Under 2 Mintues" https://www.mobilevenus.com/dupont-print-50-inch-oled-screen-2-minutes-05175638/ May 17, 2010.

"M. Wagaman et al.,"Synthesis of Organic and Water Soluble Poly (1,4-phenylenevinylenes) Containing Carboxyl Groups: Living Ring-Opening Metathesis Polymerization (ROMP) of 2.3-Dicarboxybarrelenes, Macromolecules 1197, pp. 3978-3985.

Harrell and Nguyen, "Polyacetylene and its Analogs" pp. 150-355.

European Search Report; priority document.

* cited by examiner

PASSENGER ENTERTAINMENT DEVICE, PASSENGER SEAT ARRANGEMENT AND VEHICLE

CROSS-REFERENCES TO RELATED APPLICATIONS

This application claims the benefit of the European patent application No. 19168744.1 filed on Apr. 11, 2019, the entire disclosures of which are incorporated herein by way of reference.

FIELD OF THE INVENTION

The invention relates to a passenger entertainment device and a passenger seat arrangement which are suitable for use in the passenger cabin of an aircraft, but also for use in other means of transport, such as, for example, buses or trains. The invention also relates to a vehicle, in particular an aircraft, which is provided with a passenger entertainment device and/or a passenger seat arrangement of this kind.

BACKGROUND OF THE INVENTION

Passenger seats of modern means of transport, in particular aircraft, are usually equipped with passenger entertainment devices. These passenger entertainment devices typically comprise a display screen which is attached, for example, to a back surface of a backrest of the passenger seat so as to be visible for a passenger sitting in a seat row behind the seat row including the passenger seat equipped with the display screen. The display screen may be controlled either centrally or individually, for example by means of a remote control device operated by the passenger, so as to display an entertainment program, for example a movie or a video game.

SUMMARY OF THE INVENTION

An object underlying the invention is to provide a lightweight and easy to install, as well as easy to maintain, passenger entertainment device. A further object underlying the invention is to provide a passenger seat arrangement which is equipped with a lightweight and easy to install, as well as easy to maintain, passenger entertainment device. A still further object underlying the invention is to provide a vehicle, in particular an aircraft, which is equipped with a passenger seat arrangement of this kind.

A passenger entertainment device is configured to be operated under the control of a controller associated with a passenger seat of a passenger seat arrangement. The passenger seat comprises a seat element and a backrest. The backrest may be movable relative to the seat element between an upright position and a reclined position. In its upright position, the backrest may extend at an angle of approximately 90° relative to the seat element. To the contrary, in its reclined position, the backrest may extend at an angle of approximately 100 to 130° relative to the seating element.

A pocket is provided in the region of a back surface of the backrest which faces away from the seat element. Preferably, a depth of the pocket, i.e., an extension of the pocket in a direction substantially perpendicular to the back surface of the backrest, is smaller than a depth of the backrest, i.e., an extension of the backrest in the direction substantially perpendicular to the back surface of the backrest. In particular, the pocket may be dimensioned so as to be suitable for receiving magazines, books or other small, flat items. The pocket may be formed integral with a rigid support structure of the backrest. It is, however, also conceivable that the pocket is defined by a soft fabric or textile structure which is fixed to the back surface of the backrest. The pocket preferably is accessible via an opening defining an upper boundary of the pocket.

Preferably, the controller is attached to the passenger seat, in particular a lower region of the passenger seat, either directly adjacent to a floor of a vehicle cabin to which the passenger seat may be fixed, for example with the aid of a seat rail, or at a bottom surface of the seat element which faces the floor of the vehicle cabin. It is, however, also conceivable that the controller is attached to the floor of the vehicle cabin in the vicinity of the passenger seat. In particular, the controller is configured to provide the passenger entertainment device with power and data signals, in particular video and audio data signals.

The passenger entertainment device comprises a base element, a display screen which is attached to a front surface of the base element and a cover element. The cover element is pivotably attached to the base element so as to be pivotable between a first position, in which the cover element covers the display screen, and a second position, in which the cover element exposes the display screen. Preferably, the cover element is pivotable relative to the base element about an angle of approximately 360°. The base element, the display screen and the cover element may have a substantially rectangular shape. The base element may be made from a plastic material, in particular a flame resistant plastic material.

Finally, the passenger entertainment system comprises a first fastening device which is configured to interact with a second fastening device provided on the passenger seat so as to define a fastening system for detachably fasten the passenger entertainment device to the passenger seat, in particular the backrest of the passenger seat. Specifically, the fastening system is configured to detachably fasten the cover element to the backrest of the passenger seat when the cover element is arranged in its second position and inserted into the pocket of the passenger seat, while the base element is arranged outside of the pocket with the display screen facing away from the backrest of the passenger seat. The fastening system thus allows the fastening of the passenger entertainment device to the backrest of the passenger seat in such a manner that the cover element is received and fastened in the pocket of the passenger seat, while the base element and hence the display screen is arranged in a freely suspending manner Consequently, the base element and hence the display screen assumes an orientation in a substantially vertical plane driven by gravity.

When not in use, the passenger entertainment device can be stored in the pocket of the passenger seat. If, however, a passenger sitting in a seat row behind the seat row including the passenger seat arrangement wishes to use the passenger entertainment device, he/she can simply take the passenger entertainment device out of the pocket and fasten the passenger entertainment device to the backrest of the passenger seat by means of the fastening system as described above. It is then possible for the passenger to use the passenger entertainment device in a "vertical screen mode" of use. It is, however, also possible for the passenger to hold the passenger entertainment device in his/her hand so as to use the passenger entertainment device in a "tablet mode" of use.

A heavy fixation system for fixedly attaching the passenger entertainment device to the passenger seat can be dispensed with. Consequently, the passenger entertainment device is particularly lightweight. The passenger entertainment device thus is, in particular, suitable for use on board an aircraft. In addition, the passenger entertainment device is easy to install and easy to maintain. Moreover, the passenger entertainment device is comfortable and flexible to use and hence improves the passenger comfort.

The first fastening device may be provided on the cover element of the passenger entertainment device and be adapted to interact with a complementary second fastening device provided on the backrest of the passenger seat, in particular the pocket of the passenger seat. Preferably, the first and the second fastening device are arranged so as to substantially abut against each other when the cover element of the passenger entertainment device is received in the pocket of the passenger seat.

Specifically, the first fastening device may be provided on a front surface of the cover element which faces away from the base element when the cover element is arranged in its first position. When the cover element is arranged in its second position and inserted into the pocket of the passenger seat, the front surface of the cover element faces the base element, i.e., the back surface of the base element and an inner surface of the pocket which faces the back surface of the passenger seat backrest. The second fastening device therefore preferably is provided on the inner surface of the pocket which faces the backrest of the passenger seat in order to allow an unhindered interaction between the first and the second fastening device.

The first and the second fastening device may be designed in the form of complementary mechanical fastening devices. For example, the fastening system may be designed in the form of a hook-and-loop fastening system or in the form of fasten a button system. In a preferred embodiment, the fastening system, however, is designed in the form of a magnetic fastening system. For example, the first fastening device may comprise one or more magnet(s) of a first polarity, while the second fastening device may comprise one or more magnet(s) of a second opposite polarity, such that an attraction force is generated between the magnets of the first and the second fastening device. It is, however, also conceivable to provide only one of the fastening devices with one or more magnet(s) and the other one of fastening devices with one or more element(s) made of a ferromagnetic material which is/are attracted by the one or more magnet(s).

The display screen of the passenger entertainment device preferably is designed in the form of an OLED screen, in particular a touch-sensitive OLED screen. An OLED screen has a low power consumption and provides good lightness values. A touch-sensitive screen improves the user comfort. Preferably, the passenger entertainment device is equipped with an ultra-thin flexible OLED screen which preferably has a thickness in the range of approximately 0.1 to 0.5 mm, in particular, a thickness of approximately 0.2 mm. The passenger entertainment device then can be of a particularly lightweight and space-saving design. As a result, an economy class section of an aircraft cabin which is equipped with passenger seats without passenger entertainment devices can be equipped with herein described passenger entertainment devices without increasing the spacing between subsequent seat rows. In case the herein described passenger entertainment devices are used to replace passenger entertainment devices with fixedly installed display screens, the free moving space and hence the comfort of the passengers can be increased.

The display screen of the passenger entertainment device may be attached to the base element in such a manner that an outer rim of the display screen is surrounded by an edge portion of the base element. The edge portion of the base element may have a width of approximately 3 to 7 mm, in particular, a width of approximately 5 mm.

Preferably, the cover element is designed in the form of an aircraft safety card. The provision of an additional aircraft safety card then can be dispensed with. The cover element may be made of a plastic material, in particular, a flame resistant plastic material. The content of the aircraft safety card may be printed on the front surface and/or a back surface of cover element.

The cover element may be pivotably attached to the base element by means of a spiral binding. A pivot axis of the cover element then is defined by a longitudinal axis of the spiral binding. For example, the cover element and the base element may be provided with aligned openings for receiving the windings of the spiral binding. These openings may be arranged along corresponding side edges of the cover element and the base element. In case the base element and the cover element have a substantially rectangular shape, the openings preferably are provided along one of the long side edges of the cover element and the base element.

The passenger entertainment device may be connectable to the controller via a cable. Preferably, the cable is suitable to provide the passenger entertainment device with power and data signals, in particular, video and audio data signals from the controller. The cable may be routed from the controller through the passenger seat, in particular, the backrest of the passenger seat into the pocket of the passenger seat and finally to the passenger entertainment device. Preferably, the cable is guided through the spiral binding which pivotably attaches the cover element to the base element. The spiral binding then functions as a kind of protective cable routing. It is, however, also conceivable that a wireless connection is provided between the passenger entertainment device and the controller.

The cable may be connected to the passenger entertainment device via a fixed connection port. A fixed cable connection between the controller and the passenger entertainment device ensures reliable functioning of the passenger entertainment device and, in addition, provides a theft protection function. The fixed connection port may be configured to provide an error signal to the controller in case the cable is detached from the fixed connection port. The error signal may be used as an indication that the passenger entertainment device is not properly functioning and/or as a theft protection signal.

The passenger entertainment device may further be provided with an audio jack. In particular, the audio jack may be provided in the region of a side surface of the base element. Alternatively or additionally thereto, the passenger entertainment device may be provided with a Bluetooth unit, a Wi-Fi unit and/or a Li-Fi unit in order to provide the passenger entertainment device with the capability to connect headphones or other personal devices to the passenger entertainment device via a wireless connection.

The passenger entertainment device may comprise a first support device which is pivotably attached to the base element so as to be pivotable between a first position, in which the first support device is arranged flush with a back surface of the base element, and a second position, in which the first support device protrudes from the back surface of the base element. A pivot axis of the first support element thus may be arranged in a plane defined by the back surface of the base element. When being arranged in its first position, the first support device does not affect the handling of the passenger entertainment device. To the contrary, when being arranged in its second position, the first support device may be used to support the base element when the passenger entertainment device should be used in its "vertical screen mode" of use.

When the passenger entertainment device is attached to the backrest of the passenger seat by means of the fastening system so as to be used in its "vertical screen mode" of use, the base element of the passenger entertainment device is held in a freely suspended manner and hence is oriented in a substantially vertical plane driven by gravity as described above. As long as the backrest of the passenger seat is arranged in its upright position wherein the back surface of the backrest also defines a substantially vertical plane, the base element of the passenger entertainment device more or less abuts against the back surface of the backrest. However, when the backrest of the passenger seat is moved into its reclined position, the still freely suspended and hence vertically oriented base element no longer abuts against the reclined and hence no longer vertically oriented backrest of the passenger seat.

The first support device, when being arranged in its second position, therefore preferably is configured to support the base element on the backrest of the passenger seat when the cover element is detachably fastened to the backrest of the passenger seat and the backrest of the passenger seat is moved from an upright position into a reclined position. In other words, the first support device, when being arranged in its second position prevents the base element of the passenger entertainment device from swinging and bouncing against the reclined backrest of the passenger seat while the passenger entertainment device is used in its "vertical screen mode" of use. Preferably the first support device in its second position protrudes from the back surface of the base element at a distance which bridges the distance between the back surface of the reclined passenger seat backrest and the back surface of the freely suspended and hence vertically oriented base element.

The first support device may be designed in the form of a right-angled triangle which is pivotable relative to the base element around a first leg of the right-angled triangle. The first leg of the right-angled triangle may be a longer leg of the right-angled triangle. A second leg of the right-angled triangle may be a shorter leg of the right-angled triangle and may extend substantially perpendicular from the back surface of the base element. An angle defined between the leg of the right-angled triangle which defines the pivoting axis of the first support element and a hypotenuse of the right-angled triangle preferably substantially corresponds to an angle about which the backrest of the passenger seat is reclined when being moved from its upright position into its reclined position. The first support device then is capable to fully compensate for the inclination of the backrest of the passenger seat in its reclined position.

Alternatively or additionally thereto, the first support device may be designed in the form of a hinge that has enough friction to keep the base element with the very lightweight display screen fixed at any angle. The friction should be low enough that the angle can still be manually adjusted to any favorable position.

Preferably, the first support device is pivotably attached to the base element in a central area of the back surface of the base element. This allows the first support device, when being arranged in its second position, to support the base element in a particularly stable manner.

The passenger entertainment device may further comprise a second support device which is pivotably attached to the base element so as to be pivotable between a first position, in which the second support device is arranged flush with a back surface of the base element, and a second position, in which the second support device protrudes from the back surface of the base element. A pivot axis of the second support element thus may be arranged in a plane defined by the back surface of the base element. When being arranged in its first position, the second support device does not affect the handling of the passenger entertainment device. To the contrary, when being arranged in its second position, the second support device may be used to support the base element when the passenger entertainment device should be used in its "tablet mode" of use.

Preferably, the second support device is attached to the base element in such a manner that the second support device, when being arranged in its second position, does not interfere with the cover element of the passenger entertainment device while the cover element is pivoted between its first position and its second position. In particular the second support element is attached to the base element in such a manner, that the second support device is not interfere with the cover element when the cover element is pivoted about its pivot axis defined, for example, by the longitudinal axis of the spiral binding connecting the cover element to the base element by an angle of approximately 360° so as to expose the display screen.

As described above, the passenger entertainment device may be taken out of the pocket of the passenger seat and be used like a tablet. In particular, the passenger entertainment device may be placed on a supporting plane, for example a surface of a table, in particular a surface of a tray table which is pivotably attached to the backrest of the passenger seat. In order to ensure that the display screen is still clearly visible for a user when the passenger entertainment device is placed on a substantially horizontal supporting plane and used in its "tablet mode" of use, the display screen should be inclined relative to the horizontal supporting plane.

The second support device, when being arranged in its second position, therefore may be configured to support the base element on a supporting plane when the cover element is detached from the backrest of the passenger seat and the base element is placed on the supporting plane. In other words, the second support device, when being arranged in its second position, maintains the base element in an inclined position relative to a substantially horizontally oriented supporting plane while the passenger entertainment device is used in its "tablet mode" of use.

In a preferred embodiment, the second support device comprises a pair of support elements which are pivotably attached to the base element along two opposite side edges of the base element. In case the base element has a substantially rectangular shape, the support elements preferably extend along the two short side edges of the base element. Support elements that extend along side edges of the base element allow the cover element to be pivoted between its first and its second position and even about an angle of approximately 360° about its pivot axis even when the support elements protrude from the back surface of the base element, as long as an extension of the cover element in a direction defined by a distance between the support elements is slightly smaller than the distance between the support elements.

Each of the support elements may be designed in the form of a right-angled triangle which is pivotable relative to the base element around a first leg of the right-angled triangle.

The first leg of the right-angled triangle may be a longer leg of the right-angled triangle. A second leg, which might be the shorter leg of the right-angled triangle then may extend substantially perpendicular from the back surface of the base element. An angle defined between the leg of the right-angled triangle which defines the pivoting axis of the support element and a hypotenuse of the right-angled triangle preferably substantially corresponds to an angle about which the base element should be inclined relative to the supporting plane in order to ensure that the display screen is clearly visible when the passenger entertainment device is used in its "tablet mode" of use.

A passenger seat arrangement comprises a passenger seat with a seat element and a backrest. A pocket is provided in the region of a back surface of the backrest which faces away from the seat element. The passenger seat arrangement further comprises a controller associated with the passenger seat. A passenger entertainment device is configured to be operated under the control of the controller. The passenger entertainment device comprises a base element, a display screen which is attached to a front surface of the base element and a cover element. The cover element is pivotably attached to the base element so as to be pivotable between a first position, in which the cover element covers the display screen, and a second position, in which the cover element exposes the display screen. Finally, the passenger seat arrangement comprises a fastening system which is configured to detachably fasten the passenger entertainment device to the passenger seat, in particular the backrest of the passenger seat. Specifically, the fastening system is configured to detachably fasten the cover element to the backrest of the passenger seat when the cover element is arranged in its second position and inserted into the pocket of the passenger seat, while the base element is arranged outside of the pocket with the display screen facing away from the backrest of the passenger seat.

The fastening system for fastening the passenger entertainment device to the backrest of the passenger seat may comprise a first fastening device which is provided on the cover element of the passenger entertainment device and which is adapted to interact with a complementary second fastening device provided on the backrest of the passenger seat, in particular the pocket of the passenger seat. Preferably, the first and the second fastening device are arranged so as to substantially abut against each other when the cover element of the passenger entertainment device is received in the pocket of the passenger seat.

Specifically, the first fastening device may be provided on a front surface of the cover element which faces away from the base element when the cover element is arranged in its first position. When the cover element is arranged in its second position and inserted into the pocket of the passenger seat, the front surface of the cover element faces the base element, i.e., the back surface of the base element and an inner surface of the pocket which faces the back surface of the passenger seat backrest. The second fastening device therefore preferably is provided on the inner surface of the pocket which faces the backrest of the passenger seat in order to allow an unhindered interaction between the first and the second fastening device.

The first and the second fastening device may be designed in the form of complementary mechanical fastening devices. For example, the fastening system may be designed in the form of a hook-and-loop fastening system or in the form of fasten a button system. In a preferred embodiment, the fastening system, however, is designed in the form of a magnetic fastening system. For example, the first fastening device may comprise one or more magnet(s) of a first polarity, while the second fastening device may comprise one or more magnet(s) of a second opposite polarity, such that an attraction force is generated between the magnets of the first and the second fastening device. It is, however, also conceivable to provide only one of the fastening devices with one or more magnet(s) and the other one of fastening devices with one or more element(s) made of a ferromagnetic material which is/are attracted by the one or more magnet(s).

The passenger entertainment device of the passenger seat arrangement may be designed as described above.

A vehicle is equipped with an above-described passenger entertainment device and/or an above-described passenger seat arrangement. Preferably, the vehicle is designed in the form of an aircraft. The vehicle, i.e., a passenger cabin of the vehicle may be equipped with a plurality of above-described passenger entertainment devices and/or a plurality of above-described passenger seat arrangements that may be arranged in rows one behind another.

The vehicle may comprise a passenger entertainment system server which is adapted to communicate with the controller of the passenger seat arrangement via a wireless connection. Further, the vehicle may be equipped with a central power supply system which is connected to the controller of the passenger seat arrangement.

BRIEF DESCRIPTION OF THE DRAWINGS

Preferred embodiments of the invention will now be explained in greater detail with reference to the accompanying schematic drawings, in which.

DETAILED DESCRIPTION OF THE PREFERRED EMBODIMENTS

Figure 1:
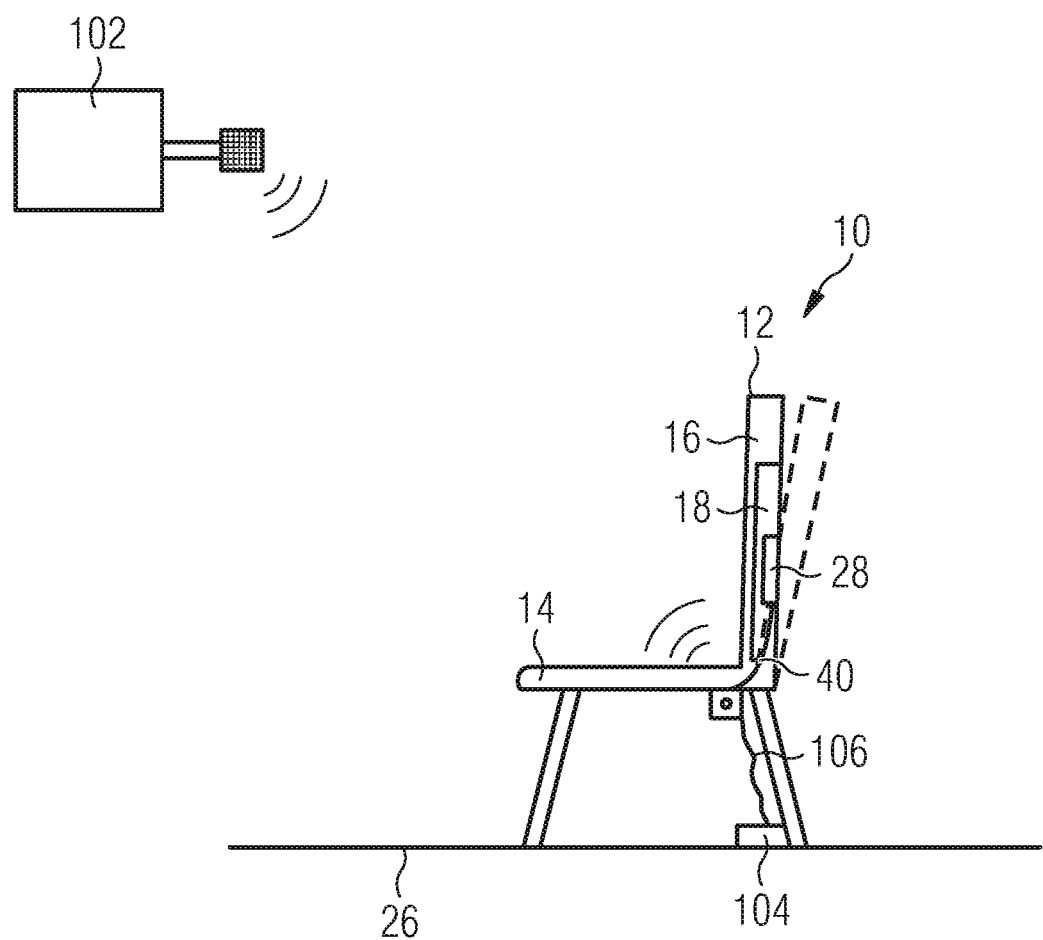
FIG. 1 shows a passenger seat arrangement which is suitable for use in the passenger cabin of a vehicle and which is equipped with a passenger entertainment device.
Figure 10:
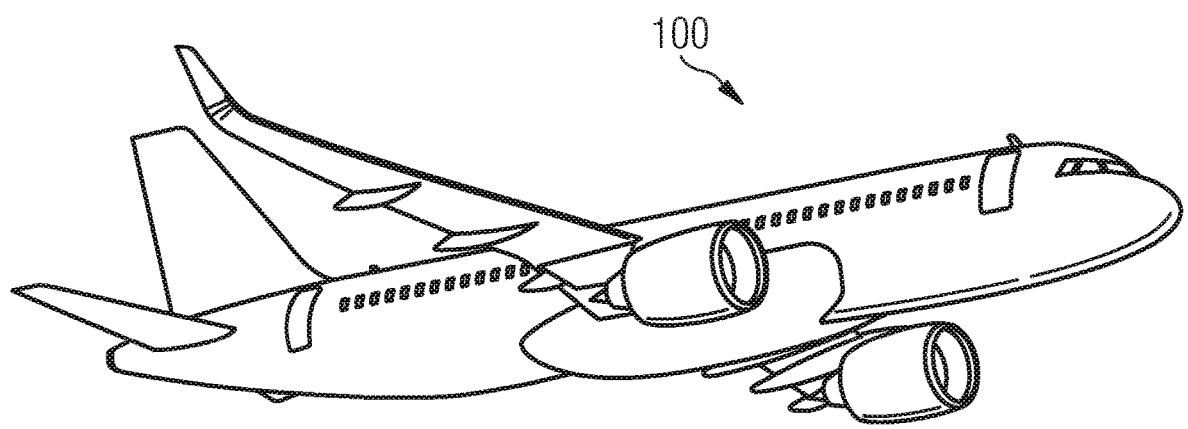
FIG. 10 shows an aircraft which is equipped with a plurality of passenger seat arrangements as depicted in FIG. 1.

FIG. 1 shows a passenger seat arrangement 10 which is suitable for use in a passenger cabin of a vehicle 100, in particular the passenger cabin of an aircraft as shown in FIG. 10. The passenger seat arrangement 10 comprises a passenger seat 12 with a seat element 14 and a backrest 16. The backrest 16 is movable relative to the seat element 14 between an upright position and a reclined position (shown in dashed lines in FIG. 1). In its upright position, the backrest 16 extends at an angle of approximately 90° relative to the seat element 14. To the contrary, in its reclined position, the backrest 16 extends at an angle of approximately 115° relative to the seating element 14.

As becomes apparent from FIGS. 4, 5, 7 and 9, a pocket 18 is provided in the region of a back surface of the backrest 16 which faces away from the seat element 14. In the embodiment of a passenger seat 12 shown in the drawings, the pocket 18 is formed integral with a rigid support structure of the backrest 16 and is accessible via an opening 20 defining an upper boundary of the pocket 18. In addition, a tray table 22 is provided in the region of the back surface of the backrest 16. The tray table 22 is movable between a stowed position and a position of use, see FIG. 7. In its stowed position, the tray table 22 extends substantially parallel to the back surface of the backrest 16. In its position of use, the tray table 22 defines a substantially horizontal plane and, in dependence of whether the backrest 16 is arranged in its upright position or in its reclined position, extends at an angle of approximately 90° to 65° relative to the back surface of the backrest 16.

The passenger seat arrangement 10 further comprises a controller 24 which is associated with the passenger seat 12. In the embodiment of a passenger seat arrangement 10 shown in the drawings, the controller 24 is attached to the passenger seat 12. Specifically, the controller 24 is attached to a bottom surface of the seat element 14 which faces a floor 26 of the passenger cabin to which the passenger seat 12 is fixed with the aid of a seat rail (not shown). The controller 24 communicates with a passenger entertainment system server 102 of the vehicle 100 via a wireless connection. Specifically, the passenger entertainment system server 102 is adapted to communicate with each of a plurality of controllers 24 which are present in the vehicle cabin of the vehicle 100 which is equipped with a plurality of seat arrangements 10 arranged in rows one behind another.

Further, the controller 24 is connected to a central power supply system 104 of the vehicle 100 which is schematically indicated in FIG. 1. In the embodiment shown in the drawings, the controller 24 is connected to the central power supply system 104 via a cable 106. It is, however, also conceivable to provide a wireless connection between the central power supply system 104 of the vehicle 100 and the controller 24.

The passenger seat arrangement further comprises a passenger entertainment device 28 which is configured to be operated under the control of the controller 24. In particular, the controller 24 provides the passenger entertainment device 28 with power and data signals, in particular video and audio data signals. When not in use, the passenger entertainment device 28 is stored in the pocket 18 of the passenger seat 12, see FIG. 1.

Figure 2:
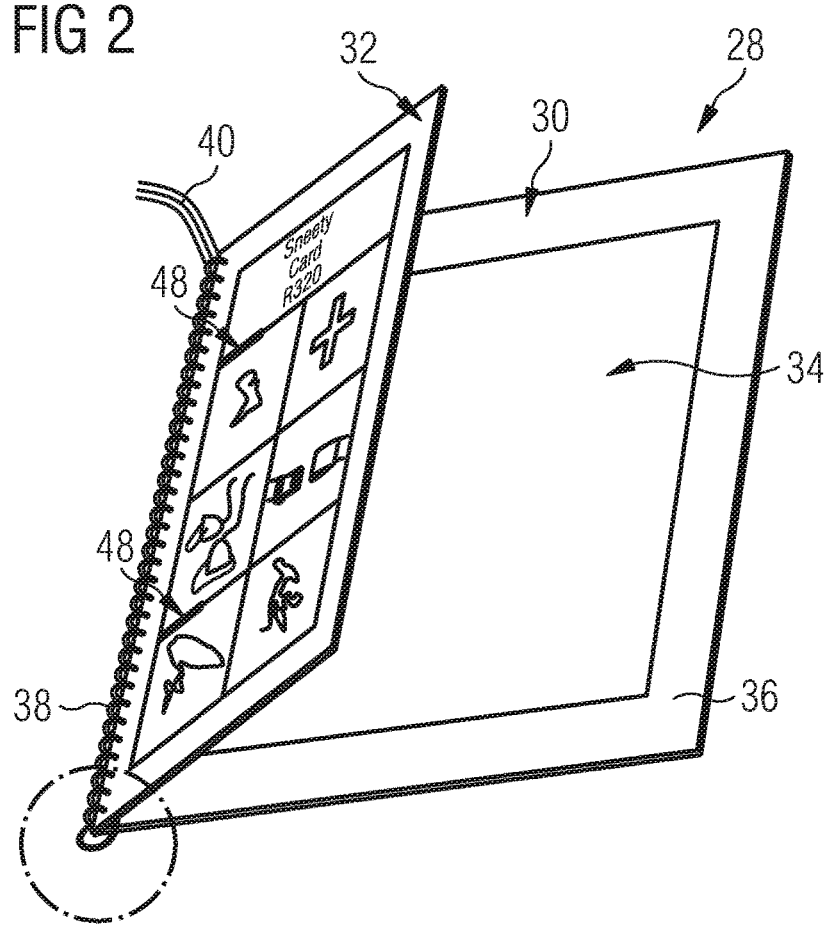
FIG. 2 shows a detailed view of the passenger entertainment device of the passenger seat arrangement according to FIG. 1.
Figure 3:
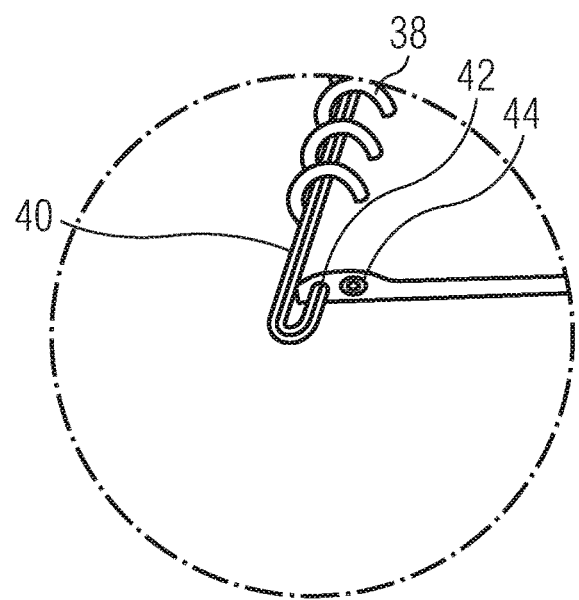
FIG. 3 shows a further detailed view of the passenger entertainment device employed in the passenger seat arrangement according to FIG. 1.

As becomes apparent, in particular from FIGS. 2 and 3, the passenger entertainment device 28 comprises a base element 30 and a cover element 32. The base element 30 is made from a flame resistant plastic material. The cover element 32 is designed in the form of an aircraft safety card. Specifically, the cover element 32 designed in the form of an aircraft safety card is made of a flame resistant plastic material, wherein the content of the aircraft safety card is printed on a front surface and a back surface of the cover element 32.

A display screen 34 is attached to a front surface of the base element 30. The display screen 34 is designed in the form of an ultra-thin flexible and touch-sensitive OLED screen. In particular, the OLED display screen 34 has a thickness of approximately 0.2 mm and is attached to the base element 30 in such a manner that an outer rim of the display screen 34 is surrounded by an edge portion 36 of the base element 30. The edge portion 36 of the base element 30 has a width of approximately 5 mm. In the embodiment of a passenger entertainment device 28 shown in the drawings, the base element 30, the display screen 34 and the cover element 32 have a substantially rectangular shape.

The cover element 32 is pivotably attached to the base element 30 so as to be pivotable between a first position, in which the cover element 32 covers the display screen 34, and a second position, in which the cover element 32 exposes the display screen 34. In particular, the cover element 32 is pivotable relative to the base element 30 about an angle of approximately 360°. As becomes apparent in particular from FIG. 2, the cover element 32 is pivotably attached to the base element 30 by means of a spiral binding 38, such that pivot axis of the cover element 32 is defined by a longitudinal axis of the spiral binding 38. In order to connect the spiral binding 38 to the cover element 32 and the base element 30, the cover element 32 and the base element 30 are provided with aligned openings (not shown) for receiving the windings of the spiral binding 38.

The passenger entertainment device 28 is connected to the controller 24 via a cable 40 which is suitable to provide the passenger entertainment device 28 with power and data signals, in particular video and audio data signals from the controller 24. The cable 40 is routed from the controller 24 through the passenger seat 12, i.e., the backrest 16 of the passenger seat 12 into the pocket 18 of the passenger seat 12 and finally to the passenger entertainment device 28, see FIG. 1. Further, the cable 14 is guided through the spiral binding 38 which pivotably attaches the cover element 32 to the base element 30.

The cable 40 is connected to the passenger entertainment device 28 via a fixed connection port 42. The fixed connection port 42 is configured to provide an error signal to the controller 24 in case the cable 40 is detached from the fixed connection port 42. The error signal output by the fixed connection port 42 in case of a separation from the cable 14 may be used as an indication that the passenger entertainment device 28 is not properly functioning and/or as a theft protection signal. Further, the passenger entertainment device 28 is provided with an audio jack 44 which, in the embodiment of a passenger entertainment device 28 shown in the drawings, is arranged in the region of a side surface of the base element 30.

As already indicated above, when not in use, the passenger entertainment device 28 is stored in the pocket 18 of the passenger seat 12. When the passenger entertainment device 28 is received in the pocket 18 of the passenger seat 12, the cover element 32 typically is arranged in its first position so as to cover the display screen 34 and to thus protect the display screen 34 from damages. If, however, a passenger sitting in a seat row behind the seat row including the passenger seat arrangement 10 wishes to use the passenger entertainment device 28, he/she can take the passenger entertainment device 28 out of the pocket 18 and use the passenger entertainment device 28 either in a "vertical screen mode" of use or in a "tablet mode" of use as will be described in more detail below.

In order to use the passenger entertainment device 28 in its "vertical screen mode" of use, the passenger, after taking the passenger entertainment device 28 out of the pocket 18, pivots the cover element 32 relative to the base element 30 so as to expose the display screen 34. In particular, the passenger pivots the cover element 32 relative to the base element 30 about an angle of approximately 360° and inserts the cover element 32 into the pocket 18 of the passenger seat 12, while the base element 30 is arranged outside of the pocket 18 with the display screen 34 facing away from the backrest 16 of the passenger seat 12, see FIGS. 4 and 5.

Consequently, the base element 30 with the display screen 34 is arranged in a freely suspending manner and assumes an orientation in a substantially vertical plane driven by gravity.

In order to ensure a proper fixation of the passenger entertainment device 28 in this position, the passenger seat arrangement 10 comprises a fastening system 46 which is configured to detachably fasten the passenger entertainment device 28 to the passenger seat 12, in particular the backrest 16 of the passenger seat 12. Specifically, the fastening system 46 is configured to detachably fasten the cover element 34 to the backrest 16 of the passenger seat 12 when the cover element 32 is arranged in its second position and inserted into the pocket 18 of the passenger seat 12, while the base element is arranged outside of the pocket 18 with the display screen 34 facing away from the backrest 16 of the passenger seat 12.

The fastening system 46 comprises a first fastening device 48 which is provided on the cover element 32 of the passenger entertainment device 28 and which is adapted to interact with a complementary second fastening device 50 provided on the backrest 16 of the passenger seat 12, in particular the pocket 18 of the passenger seat 12. In the embodiment of a fastening system 46 shown in the drawings, the fastening system 46 is designed in the form of a magnetic fastening system, wherein the first fastening device 48 is designed in the form of a first pair of magnets and is provided on a front surface of the cover element 32 which faces away from the base element 30 when the cover element 32 is arranged in its first position, see FIG. 2.

Figure 4:
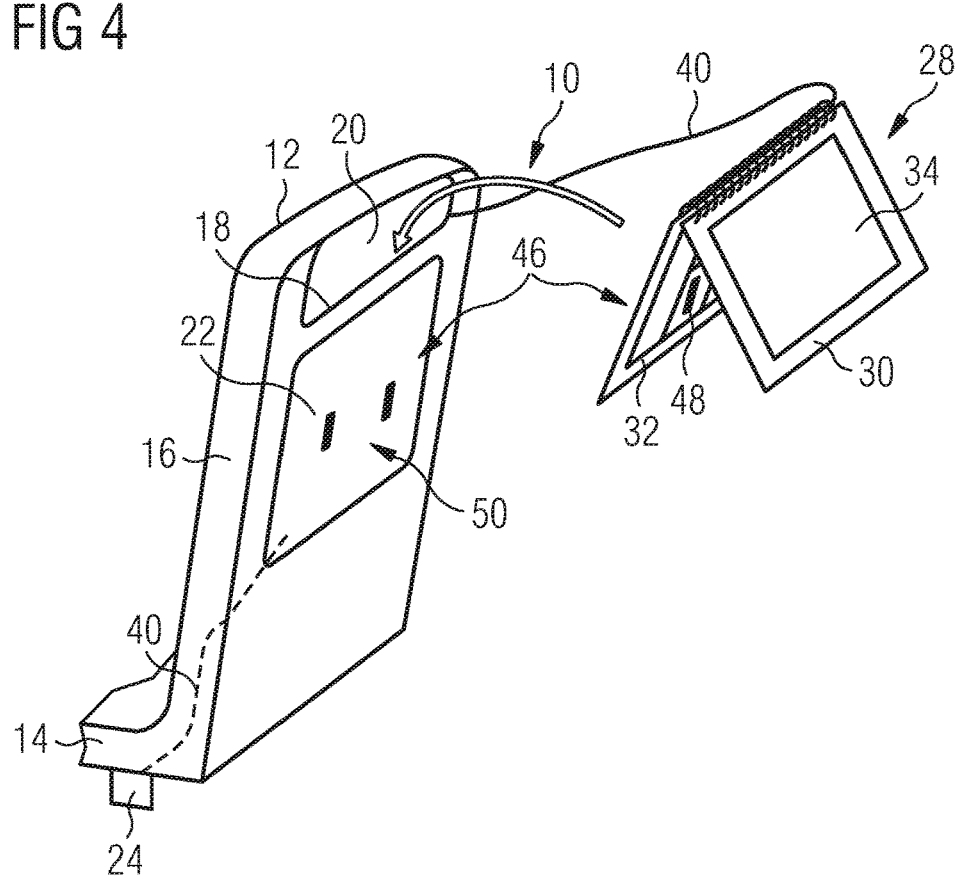
FIGS. 4 to 6 illustrate a "vertical screen mode" of using the passenger entertainment device employed in the passenger seat arrangement according to FIG. 1.

The second fastening device 50 is designed in the form of a second pair of magnets and is provided on an inner surface of the pocket 18 which faces the backrest 16 of the passenger seat 12, see FIG. 4. The magnets of the first and the second fastening device 48, 50 have opposite polarities so as to generate a magnetic attraction force when the first and the second fastening device 48, 50 approach and finally abut against each other when the cover element 32 of the passenger entertainment device 28 is inserted and finally received in the pocket 18 of the passenger seat 12.

When the passenger entertainment device 28 is attached to the backrest 16 of the passenger seat 12 by means of the fastening system 48 so as to be used in its "vertical screen mode" of use, the base element 30 of the passenger entertainment device 28 more or less abuts against the back surface of the backrest 16 as long as the backrest 16 is arranged in its upright position wherein the back surface of the backrest 16 also defines a substantially vertical plane. However, when the backrest 16 of the passenger seat 12 is moved into its reclined position, the still freely suspended and hence vertically oriented base element 30 no longer abuts against the reclined and hence no longer vertically oriented backrest 16 of the passenger seat 12.

Figure 6:
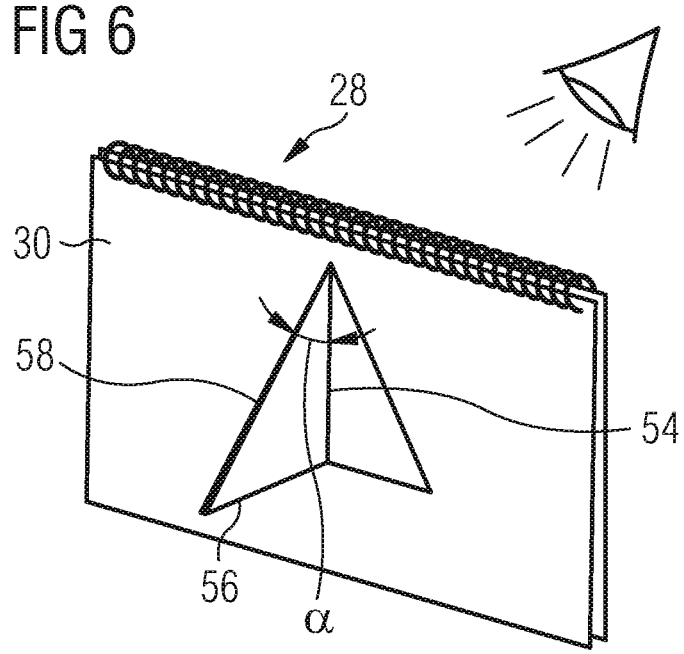
Figure 7:
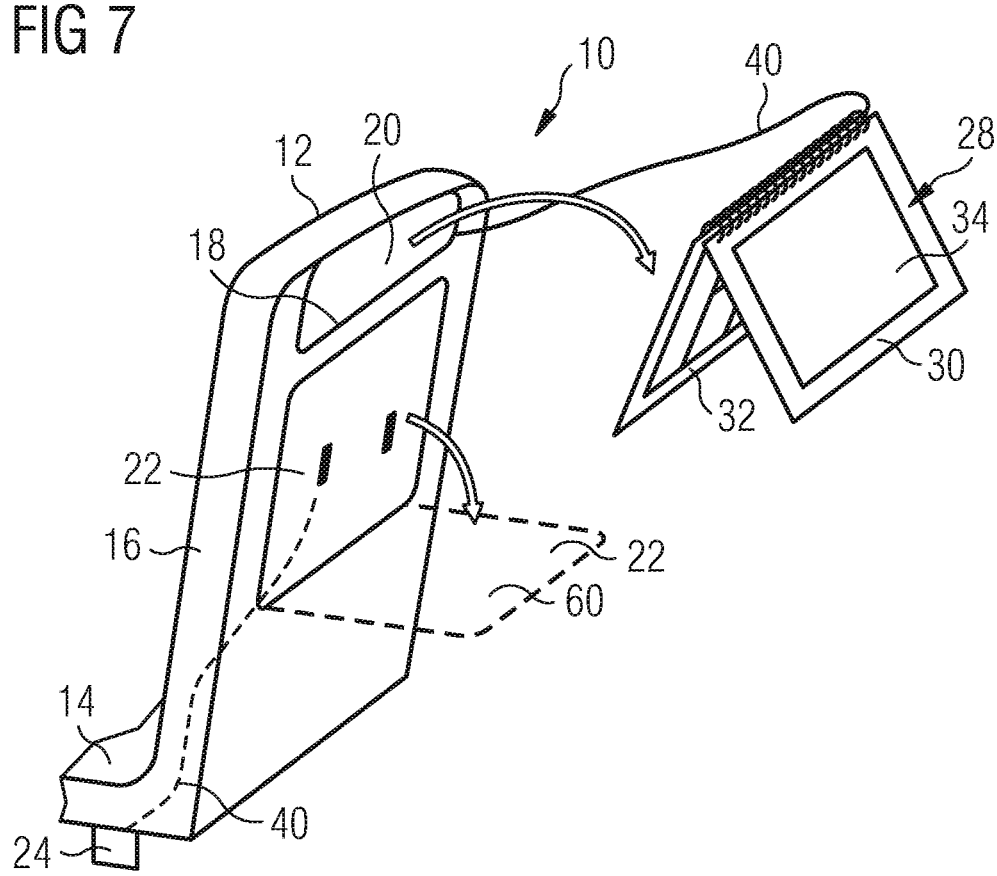
FIGS. 7 to 9 illustrate a "tablet mode" of using the passenger entertainment device employed in the passenger seat arrangement according to FIG. 1.

The passenger entertainment device 28 therefore further comprises a first support device 52 which is pivotably attached to the base element 13 so as to be pivotable between a first position, in which the first support device 52 is arranged flush with a back surface of the base element 30, and a second position, in which the first support device 52 protrudes from the back surface of the base element 30, see FIG. 6. A pivot axis of the first support element 52 is arranged in a plane defined by the back surface of the base element 30. As a consequence, when being arranged in its first position, the first support device 52 does not affect the handling of the passenger entertainment device 28.

Figure 5:
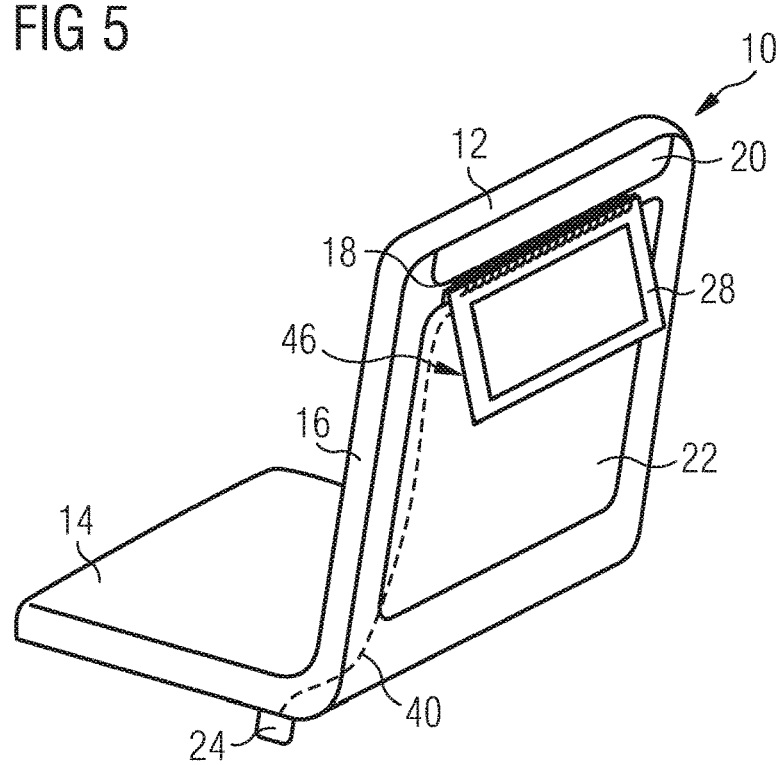

To the contrary, when being arranged in its second position, the first support device 52 supports the base element 30 on the backrest 16 of the passenger seat 12 when the cover element 32 is detachably fastened to the backrest 16 of the passenger seat 12 and the backrest 16 of the passenger seat 12 is moved from its upright position into its reclined position and when the backrest 16 is arranged in its reclined position. Consequently, the first support device 52, when being arranged in its second position prevents the base element 30 of the passenger entertainment device 28 from swinging and bouncing against the reclined backrest 16 of the passenger seat 12 while the passenger entertainment device 28 is used in its "vertical screen mode" of use as shown in FIG. 5. In order to support the base element 30 in a particularly stable manner, the first support device 52 is pivotably attached to the base element 30 in a central area of the back surface of the base element 30.

As becomes apparent from FIG. 6, the first support device 52 is designed in the form of a right-angled triangle which is pivotable relative to the base element 30 around a first, longer leg 54 of the right-angled triangle. A second, shorter leg 56 of the right-angled triangle extends substantially perpendicular from the back surface of the base element 30. An angle $\alpha$ defined between the first leg 52 of the right-angled triangle which defines the pivoting axis of the first support element 52 and a hypotenuse 58 of the right-angled triangle substantially corresponds to an angle about which the backrest 16 of the passenger seat is reclined when being moved from its upright position into its reclined position. In the embodiment of a passenger seat arrangement 10 shown in the drawings, the angle $\alpha$ is approximately 25°. The first support device 52 thus is capable to fully compensate for the inclination of the backrest 16 of the passenger seat 12 in its reclined position.

Figure 9:
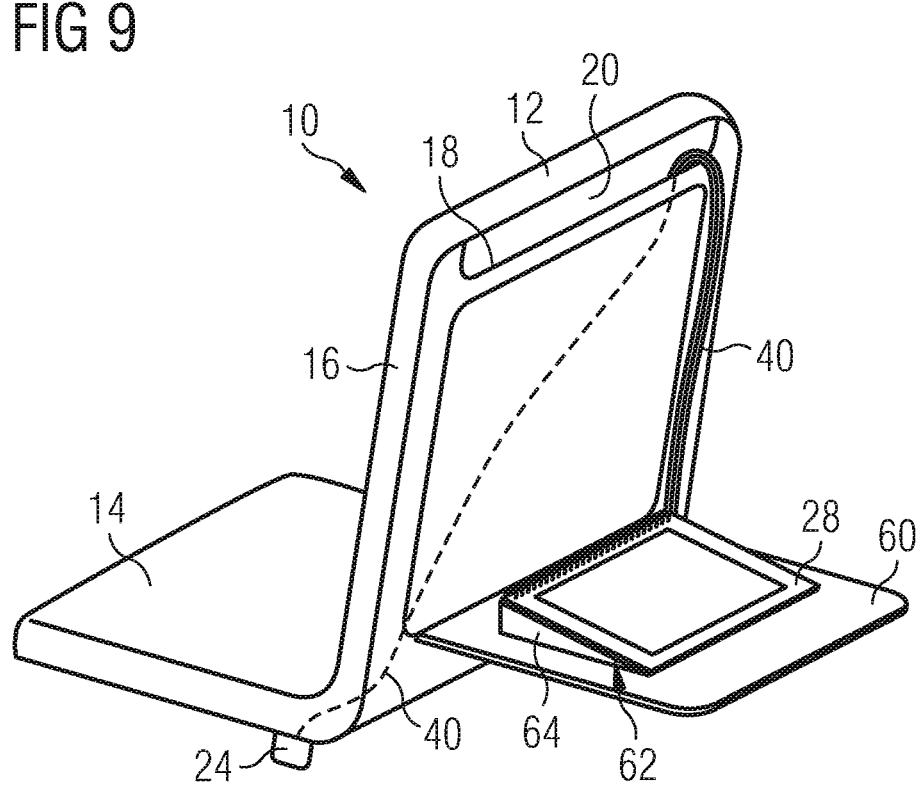

In case the passenger entertainment device 28 should be used in its "tablet mode" of use, the passenger using the passenger entertainment device 28 might wish to place the passenger entertainment device 28 on a supporting plane 60 which may be defined, for example, by a surface of the tray table 22 being arranged in its position of use as shown, for example, in FIG. 9. In order to ensure that the display screen 34 is still clearly visible the passenger entertainment device 28 is placed on the substantially horizontal supporting plane 60 and used in its "tablet mode" of use, the display screen 34 should be inclined relative to the horizontal supporting plane 60.

The passenger entertainment device 28 therefore further comprises a second support device 62 which is pivotably attached to the base element 30 so as to be pivotable between a first position, in which the second support device 62 is arranged flush with a back surface of the base element 30, and a second position, in which the second support device 62 protrudes from the back surface of the base element 30. A pivot axis of the second support element 62 is arranged in a plane defined by the back surface of the base element 30. As a consequence, when being arranged in its first position, the second support device 62 does not affect the handling of the passenger entertainment device 28.

Figure 8:
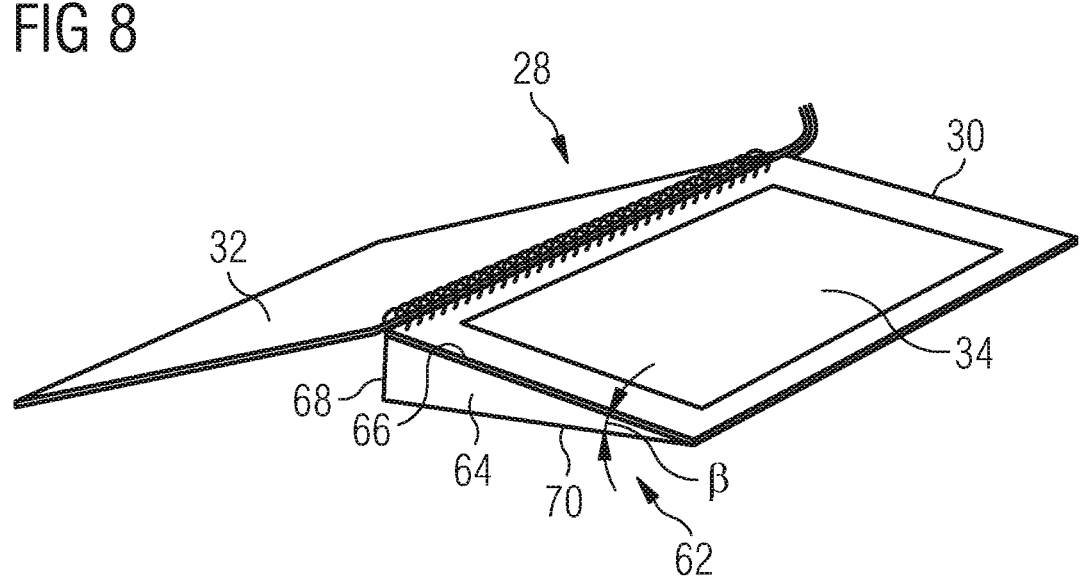

To the contrary, when being arranged in its second position, the second support device 62 supports the base element 30 on the supporting plane 60 when the cover element 32 is detached from the backrest 16 of the passenger seat 12 and the base element 30 is placed on the supporting plane 60 as shown in FIGS. 8 and 9. Consequently, the second support device 62, when being arranged in its second position, maintains the base element 30 in an inclined position relative to a substantially horizontally oriented supporting plane 60 while the passenger entertainment device 28 is used in its "tablet mode" of use.

For using the passenger entertainment device 28 in its "tablet mode" of use, the cover element 32 may be pivoted about its pivot axis relative to the base element 30 by only about approximately 180° as shown in FIG. 8. It might, however, also be desirable to pivot the cover element 32 relative to the base element 30 by approximately 360° as shown in FIG. 9 although the second support device 62 is arranged in its second position. The second support device 62 therefore is attached to the base element 30 in such a manner that the second support device 62, when being arranged in its second position, does not interfere with the cover element 32 of the passenger entertainment device 28 while the cover element 32 is pivoted between its first position and its second position.

In the embodiment shown in the drawings, the second support device 62 comprises a pair of support elements 64 which are pivotably attached to the base element 30 along two opposite side edges of the base element 30. In particular, the support elements 64, when being arranged in the second position, extend along the two short side edges of the base element 30 at a distance from each other which is slightly larger than an extension of the cover element 32 in a direction defined by the distance between the support elements 64 and corresponding to the direction of the pivot axis of the cover element 32. Consequently, the cover element 32 can be pivoted about its pivot axis without interfering with the support elements 64.

Each of the support elements 64 is designed in the form of a right-angled triangle which is pivotable relative to the base element 30 around a first, longer leg 66 of the right-angled triangle. A second, shorter leg 68 of the right-angled triangle extends substantially perpendicular from the back surface of the base element 30. An angle β defined between the first leg 66 of the right-angled triangle which defines the pivoting axis of the support element 64 and a hypotenuse 17 of the right-angled triangle preferably substantially corresponds to an angle about which the base element 30 should be inclined relative to the supporting plane 60 in order to ensure that the display screen 34 is clearly visible when the passenger entertainment device 28 is used in its "tablet mode" of use. In the embodiment of a passenger seat arrangement 10 shown in the drawings, the angle β is approximately 10°.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger entertainment device which is configured to be operated under control of a controller associated with a passenger seat of a passenger seat arrangement, wherein the passenger seat comprises a seat element, a backrest and a pocket provided in a region of a back surface of the backrest which faces away from the seat element, and wherein the passenger entertainment device comprises:

a base element;
a display screen which is attached to a front surface of the base element; and
a cover element which is pivotably attached to the base element to be pivotable between a first position, in which the cover element covers the display screen, and a second position, in which the cover element exposes the display screen; and
a first fastening device which is configured to interact with a second fastening device provided on the passenger seat to define a fastening system for detachably fastening the cover element to the backrest of the passenger seat when the cover element is arranged in the second position and inserted into the pocket of the passenger seat, while the base element is arranged outside of the pocket with the display screen facing away from the backrest of the passenger seat.

2. The passenger entertainment device according to claim 1, wherein the first fastening device is provided on a front surface of the cover element which faces away from the base element when the cover element is arranged in the first position.

3. The passenger entertainment device according to claim 1, wherein at least one of:
the display screen of the passenger entertainment device is configured as an OLED screen,
the display screen of the passenger entertainment device is configured as a touch-sensitive OLED screen, or
the display screen of the passenger entertainment device is attached to the base element such that an outer rim of the display screen is surrounded by an edge portion of the base element.

4. The passenger entertainment device according to claim 1, wherein the cover element is configured as an aircraft safety card.

5. The passenger entertainment device according to claim 1, wherein the cover element is pivotably attached to the base element by means of a spiral binding.

6. The passenger entertainment device according to claim 1, wherein the passenger entertainment device is connectable to the controller via a cable, wherein the cable is guided through a spiral binding which pivotably attaches the cover element to the base element.

7. The passenger entertainment device according to claim 6, wherein the cable is connected to the passenger entertainment device via a fixed connection port, wherein the fixed connection port is configured to provide an error signal to the controller in case the cable is detached from the fixed connection port.

8. The passenger entertainment device according to claim 1, wherein the passenger entertainment device further is provided with an audio jack, wherein the audio jack is provided in a region of a side surface of the base element.

9. The passenger entertainment device according to claim 1, wherein the passenger entertainment device further comprises a first support device which is pivotably attached to the base element to be pivotable between a first position, in which the first support device is arranged flush with a back surface of the base element, and a second position, in which the first support device protrudes from the back surface of the base element.

10. The passenger entertainment device according to claim 9, wherein the first support device, when being arranged in the second position, is configured to support the base element on the backrest of the passenger seat when the cover element is detachably fastened to the backrest of the passenger seat and the backrest of the passenger seat is moved from an upright position into a reclined position.

11. The passenger entertainment device according to claim 9, wherein the first support device is configured as a right-angled triangle which is pivotable relative to the base element around a first leg of the right-angled triangle.

12. The passenger entertainment device according to claim 9, wherein the first support device is pivotably attached to the base element in a central area of the back surface of the base element.

13. The passenger entertainment device according to claim 1, wherein the passenger entertainment device further comprises a second support device which is pivotably attached to the base element to be pivotable between a first position, in which the second support device is arranged flush with the back surface of the base element, and a second position, in which the second support device protrudes from the back surface of the base element.

14. The passenger entertainment device according to claim 13, wherein the second support device, when being arranged in the second position, is configured to support the base element on a supporting plane when the cover element is detached from the backrest of the passenger seat and the base element is placed on the supporting plane.

15. The passenger entertainment device according to claim 13, wherein the second support device comprises a pair of support elements which are pivotably attached to the base element along two opposite side edges of the base element.

16. The passenger entertainment device according to claim 15, wherein each of the support elements is configured as a right-angled triangle which is pivotable relative to the base element around a first leg of the right-angled triangle.

17. A passenger seat arrangement comprising:
 a passenger seat with a seat element and a backrest, wherein a pocket is provided in a region of a back surface of the backrest which faces away from the seat element;
 a controller associated with the passenger seat;
 a passenger entertainment device configured to be operated under control of the controller, wherein the passenger entertainment device comprises a base element, a display screen which is attached to a front surface of the base element and a cover element which is pivotably attached to the base element to be pivotable between a first position, in which the cover element covers the display screen, and a second position, in which the cover element exposes the display screen; and
 a fastening system configured to detachably fasten the cover element to the backrest of the passenger seat when the cover element is arranged in its second position and inserted into the pocket of the passenger seat, while the base element is arranged outside of the pocket with the display screen facing away from the backrest of the passenger seat.

18. The passenger seat arrangement according to claim 17, wherein the fastening system comprises at least one of:
 a first fastening device provided on a front surface of the cover element which faces away from the base element when the cover element is arranged in its first position, and a second fastening device provided on an inner surface of the pocket which faces the backrest of the passenger seat, or
 wherein the fastening system is configured as a magnetic fastening system.

19. A vehicle which is equipped with a passenger entertainment device according to claim 1.

20. The vehicle according to claim 19, further comprising at least one of:
 a passenger entertainment system server configured to communicate with the controller of the passenger seat arrangement via a wireless connection; or
 a central power supply system which is connected to the controller of the passenger seat arrangement.

* * * * *